T. E. BART.
BUBBLER FOR DRINKING FOUNTAINS.
APPLICATION FILED MAR. 5, 1920.

1,376,916.

Patented May 3, 1921

Inventor
Thomas E. Bart
By Walter F. Murray
Attorney

UNITED STATES PATENT OFFICE.

THOMAS E. BART, OF CINCINNATI, OHIO, ASSIGNOR TO THE MURDOCK MANUFACTURING AND SUPPLY CO., OF CINCINNATI, OHIO, A CORPORATION OF OHIO.

BUBBLER FOR DRINKING-FOUNTAINS.

1,376,916.  Specification of Letters Patent.  Patented May 3, 1921.

Application filed March 5, 1920. Serial No. 363,622.

*To all whom it may concern:*

Be it known that I, THOMAS E. BART, a citizen of the United States of America, and resident of Cincinnati, in the county of Hamilton and State of Ohio, have invented a new Improvement in Bubblers for Drinking-Fountains, of which the following is a specification.

The object of my invention is to provide a stream director or bubbler that can be adjusted to change the direction of the discharge of the water after the fountain is installed. Another object is to provide a bubbler that is self-draining and sanitary. These and other objects are attained by the means described hereinafter and disclosed in the following drawing.

Figure 1:
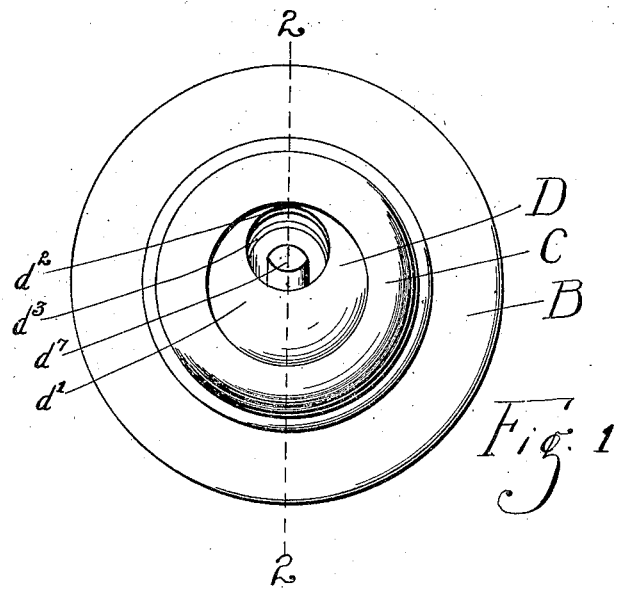
Figure 1 is a plan view of my bubbler invention.
Figure 2:
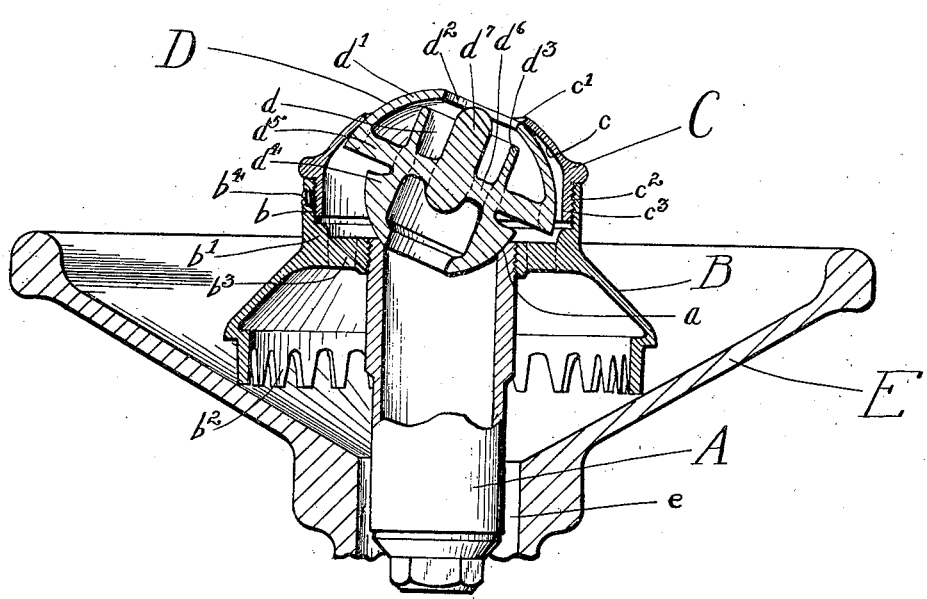
Fig. 2 is a sectional view on line 2—2 of Fig. 1.

My invention applies to bubblers used on drinking fountains. I have provided a stream director that may be moved in relation to the other sections of the bubbler and that may be secured in any discharge position to which it may have been moved.

Attached to the upper end of the supply pipe A is an apron B. A screw cap C has a globular upper wall $c$ having a central orifice $c'$. A screw thread $c^2$, formed about the neck $c^3$ of the cap, is adapted to engage screw thread $b$ formed on the shank $b'$ of the apron B.

A stream director D is seated on the upper end of the supply pipe A and is retained upon such seat by the screw cap C. The director D has a central passage $d$ registering with the aperture in the upper end $a$ of the supply pipe A and with the orifice $c'$ in screw cap C. The director has a semispherical bonnet $d'$ formed on a radius slightly smaller than is the globular wall $c$ of the cap. An orifice $d^2$ in the center of the bonnet $d'$ registers with the passage $d$ formed by the cylindrical wall $d^3$ of the director. The orifice $d^2$ is smaller than the orifice $c'$. A section of the bonnet is exposed between these two orifices. The director is so constructed that it can be revolved on its vertical axis but can be only partially revolved on any horizontal axis within the space between the cap C and the seat formed at $a$ on the pipe A. A semispherical section $d^4$ formed on the lower part of the director has a smaller radius upon which its form is developed than the radius employed in forming the bonnet. The bonnet is attached to the outer side of the wall $d^3$ by means of spider $d^5$. This spider is the only connection between the walls $d^3$ and the bonnet $d'$, there being a small space between the upper end of the wall and the inside surface of the bonnet. Inside of the passage $d$ and affixed to the wall of the passage by spider $d^6$ is a stud $d^7$, the upper end of which is slightly below the outside edge of the bonnet. The director can be revolved between the cap and apron on any of its horizontal axes only to the extent of causing the edge of the aperture $d^2$ to coincide with the edge of the aperture or orifice $c'$. These orifices can be enlarged or reduced and modified in relation to one another.

On the lower part of apron B are a series of teeth $b^2$. These teeth serve as strainers for the waste water caught by basin E outside of the bubbler as it passes to the drain $e$. A spider $b^3$ drains and strains the water from cavities inside the cap, apron and director as it passes to the drain $e$.

The operation of my device is as follows: The screw cap C is unscrewed from the apron B sufficiently to permit the director D to be adjusted within the space confining the director. When the director has been set so as to discharge the water at the proper angle and in the proper direction, the screw cap is screwed into the shank $b'$ until it securely seats the director upon both the supply pipe and the globular inner surface of the screw cap. The stud $d^7$ together with the spider $d^6$ act as strainers and prevent any articles that might obstruct the fountain from entering the supply pipe. The stud has the effect, by combining the effect of capillary action with the rounded top of the stud terminating slightly below the orifice, of concentrating the jet of water at a central point slightly above the orifice. The spider $d^5$ and the sections about the spider $b^3$ act as strainers for the water passing between the tops of the walls $d^3$ and the inside of bonnet $d'$ to the drain $e$. The water passing through this passage keeps the bubbler clean on the inside. As the stud $d^7$ extends slightly above the top of walls $d^3$, it is impossible by the placing of the finger over the orifice $d^2$ to completely close the opening in the upper end of the director, whereby the device is anti-squirting. The back pressure resulting from placing an obstruction over orifice $d^2$ will divert the water through the channel formed between the top of walls $d^3$ and the inside of bonnet $d'$. A set screw $b^4$ can be used to lock the cap to the apron.

Having thus described my invention, what I claim is:

1. A bubbler comprising a supply pipe, an apron attached to the pipe, a cap engaging the apron and an adjustable director adapted to be retained between the pipe, the apron and the cap.

2. In a bubbler the combination with a director comprising walls supporting an arched bonnet and a central stud, and having a central passage, of a screw cap having a central orifice, an apron and a supply pipe adapted to fixedly retain the director in any one of variable positions whereby a flow of fluid may be directed from the supply pipe to the orifice in the cap.

3. In a bubbler the combination with a supply pipe having a seat formed about a central bore, of an apron attached to the pipe, and having a neck, a cap having a central orifice and engaging the neck on the apron, and a director, having a central passage registering with the central bore of the supply pipe and the central orifice of the cap, mounted on the supply pipe seat and retained thereon by the cap.

4. In a bubbler the combination with a supply pipe having a seat formed about a central bore of an apron having a neck, a cap having a globular top with a central orifice therein, engaging the neck on the apron, and a director comprising a wall forming a central passage, a globular surface formed on the base of the wall adapted to contact the seat on the supply pipe, a bonnet attached to the wall by a spider, having a central orifice disposed above the passage, the bonnet engaging the globular top of the cap and a central stud supported within the passage by a spider, whereby a flow of water may be directed at various angles from the supply pipe to and beyond the central orifice in the cap.

5. In a bubbler the combination with a supply pipe having a seat formed about a central bore of an apron having a drain spider, drain teeth, and a neck, a cap having a globular top with a central orifice therein, engaging the neck on the apron, and a director comprising a wall forming a central passage, a globular surface formed on the base of the wall adapted to contact the seat on the supply pipe, a bonnet, attached to the wall by a spider, having a central orifice disposed above the passage, the bonnet engaging the globular top of the cap and a central stud supported within the passage by a spider, whereby a flow of water may be directed at various angles from the supply pipe to and beyond the central orifice in the cap.

In witness whereof, I have hereunto subscribed my name this 2nd day of March, 1920.

THOMAS E. BART.